United States Patent
Hirota et al.

[11] Patent Number: 6,029,443
[45] Date of Patent: Feb. 29, 2000

[54] CATALYST WITH UPSTREAM COOLING AND DOWNSTREAM HEATING

[75] Inventors: Shinya Hirota, Susono; Toshiaki Tanaka, Numazu; Satoshi Iguchi, Mishima; Tatsuji Mizuno; Kazuya Kibe, both of Susono, all of Japan

[73] Assignee: Toyota Jidosha Kabushiki Kaisha, Aichi-Ken, Japan

[21] Appl. No.: 08/861,292

[22] Filed: May 21, 1997

[30] Foreign Application Priority Data

May 24, 1996 [JP] Japan ..................... 8-130154
Oct. 23, 1996 [JP] Japan ..................... 8-280812

[51] Int. Cl.⁷ ..................................................... F01N 3/10
[52] U.S. Cl. .................. 60/298; 60/300; 60/303
[58] Field of Search ............... 60/286, 298, 299, 60/300, 301, 320, 303

[56] References Cited

U.S. PATENT DOCUMENTS

| | | | |
|---|---|---|---|
| Re. 25,858 | 9/1965 | Matvay ................... | 60/297 X |
| 3,733,829 | 5/1973 | Henault . | |
| 3,768,982 | 10/1973 | Kitzner et al. ........... | 60/300 X |
| 5,033,264 | 7/1991 | Cabral .................... | 60/298 X |
| 5,229,080 | 7/1993 | Abe et al. ............... | 60/300 X |
| 5,234,668 | 8/1993 | Harada et al. .......... | 60/300 X |
| 5,417,052 | 5/1995 | Swars et al. .............. | 60/300 |
| 5,460,511 | 10/1995 | Grahn . | |
| 5,465,573 | 11/1995 | Abe et al. ............... | 60/303 X |
| 5,474,745 | 12/1995 | Fukui et al. . | |
| 5,533,167 | 7/1996 | Kondo et al. ........... | 60/300 X |
| 5,538,698 | 7/1996 | Abe et al. ............... | 60/300 X |
| 5,599,509 | 2/1997 | Toyao et al. ........... | 60/297 X |
| 5,685,145 | 11/1997 | Sung et al. .............. | 60/297 X |

FOREIGN PATENT DOCUMENTS

| | | |
|---|---|---|
| 2951621 | 7/1981 | Germany . |
| 4310926 | 10/1994 | Germany . |
| 4414904 | 4/1995 | Germany . |
| 63-283727 | 11/1988 | Japan . |
| 4175416 | 6/1992 | Japan . |
| 4265414 | 9/1992 | Japan . |
| 5-133222 | 5/1993 | Japan ..................... 60/300 |

OTHER PUBLICATIONS

Patent Abstracts of Japan, vol. 007, No. 037 (M–193), Feb. 15, 1983 & JP 57 188721 A (Nippon Radiator KK), Nov. 19, 1982.
Patent Abstracts of Japan, vol. 018, No. 568 (C–1266), Oct. 31, 1994 & JP 06 205939 A (Mitsubishi Heavy Ind., Ltd.) Jul. 26, 1994.
Patent Abstracts of Japan, vol. 011, No. 234 (M–611), Jul. 30, 1987 & JP 62 045922 A (Mitsubishi Heavy Ind., Ltd.), Feb. 27, 1987.

*Primary Examiner*—John E. Ryznic
*Attorney, Agent, or Firm*—Kenyon & Kenyon

[57] ABSTRACT

According to the present invention, there is provided an exhaust gas purification device for an engine having an exhaust passage, the device comprising a catalyst arranged in the exhaust passage and having an upstream end and a downstream end, a purification ratio of exhaust gas by the catalyst becoming more than a predetermined ratio when a temperature of the catalyst is within a predetermined temperature range, cooling means for cooling the upstream end of the catalyst, heating means for heating the downstream end of the catalyst, and control means for controlling the cooling means and the heating means to maintain the temperature of a portion of the catalyst, which portion is positioned between the upstream end and the downstream end, in the predetermined temperature range.

9 Claims, 17 Drawing Sheets

CATALYST WITH UPSTREAM COOLING AND DOWNSTREAM HEATING

BACKGROUND OF THE INVENTION

1. Field of the Invention

The invention relates to an exhaust gas purification device of an engine.

2. Description of the Related Art

An exhaust gas purification device is known, which comprises a catalyst for purifying exhaust gas at the predetermined temperature range of the catalyst. For example, Japanese Unexamined Patent Publication No. 63-283727 discloses an exhaust gas purification device, which comprises a catalyst for purifying $NO_x$ in exhaust gas discharged from a diesel engine. The $NO_x$ catalyst reacts $NO_x$ in exhaust gas with HC to produce $N_2$, $CO_2$ and $H_2O$ in order to purify $NO_x$.

The $NO_x$ catalyst may purify exhaust gas only within a predetermined temperature range thereof. FIG. 30 shows a relation between the temperature of the catalyst and the purification ratio for $NO_x$. As shown in FIG. 30, the $NO_x$ catalyst starts to purify exhaust gas at about 120° C., and from about 120° C., the purification ratio for $NO_x$ is increased as the temperature of the catalyst is increased until at about 230° C. The purification ratio for $NO_x$ is decreased as the temperature of the catalyst is decreased from about 230° C., and finally the catalyst does not purify exhaust gas at about 350° C.

The reason why the purification ratio of the catalyst is changed as above described is that an amount of HC to be reacted with $NO_x$ is decreased since the reaction between HC and $O_2$ becomes greater than the reaction between $NO_x$ and HC above a certain high temperature of the catalyst.

Therefore, to obtain a high purification ratio for $NO_x$ in the prior art, the temperature of the catalyst should be controlled to maintain the temperature of the catalyst within the temperature range at which the catalyst purifies exhaust gas, in particular, within the optimum temperature range at which the purification ratio for $NO_x$ is highest.

The temperature of the catalyst is subject to heat produced by the reaction between $NO_x$ and HC, and between HC and $O_2$, and derived from exhaust gas. Therefore, in order to maintain the temperature of the catalyst within the temperature range at which the catalyst purifies exhaust gas, in particular, within the optimum temperature range at which the purification ratio for $NO_x$ is highest, it is necessary to control the temperature of the catalyst, for example, in such a manner that heating and cooling devices is arranged at the upstream area of the catalyst, and the heating device is operated when the temperature of the catalyst is lower than the above optimum temperature range while the cooling device is operated when the temperature of the catalyst is higher than the above optimum temperature range. However, the reaction in the catalyst and the temperature of exhaust gas are changed depending on the condition of the engine. Further, the reaction occurs locally in the catalyst. Therefore, it is complicated and difficult to control the temperature of the catalyst to maintain the temperature of the catalyst within the small optimum temperature range.

SUMMARY OF THE INVENTION

Accordingly, the object of the invention is to provide an exhaust gas purification device which allows to reliably maintain the temperature of the catalyst within the optimum temperature range at which the catalyst purifies exhaust gas.

According to the present invention, there is provided an exhaust gas purification device of an engine having an exhaust passage, the device comprising a catalyst arranged in the exhaust passage and having an upstream end and a downstream end, a purification ratio of exhaust gas by the catalyst becoming more than a predetermined ratio when a temperature of the catalyst is within a predetermined temperature range, cooling means for cooling the upstream end of the catalyst, heating means for heating the downstream end of the catalyst, and control means for controlling the cooling means and the heating means to maintain the temperature of a portion of the catalyst, which portion is positioned between the upstream end and the downstream end, in the predetermined temperature range.

The present invention may be more fully understood from the description of the preferred embodiments of the invention set forth below, together with the accompanying drawings.

DESCRIPTION OF THE PREFERRED EMBODIMENTS

Figure 1:
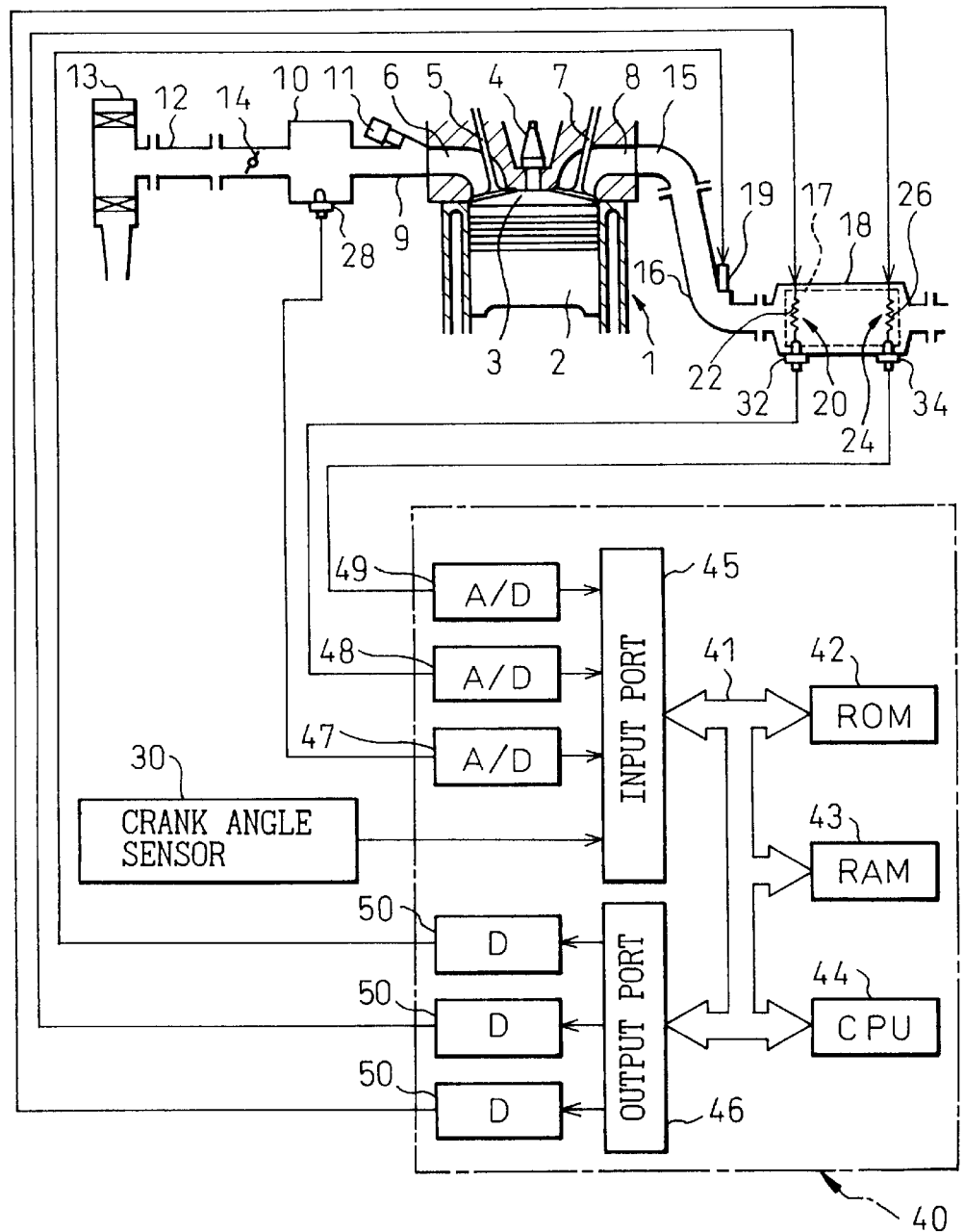
FIG. 1 is a view of the engine with the exhaust gas purification device according to the invention.

Referring to FIG. 1, reference number 1 is an engine body, 2 is a piston, 3 is a combustion chamber, 4 is a spark plug, 5 is an intake valve, 6 is an intake port, 7 is an exhaust valve, and 8 is an exhaust port. The intake port 6 is connected to a surge tank 10 via an associated intake manifold 9. A fuel injector 11 for injecting fuel toward the interior of the associated intake port 6 is mounted on each of the intake manifold 9. The surge tank 10 is connected to an air cleaner 13 via an intake duct 12. A throttle valve 14 is mounted in the intake duct 12. The exhaust port 8 is connected to a casing 18, which incorporates a $NO_x$ catalyst 17, via the exhaust manifold 15 and an exhaust pipe 16.

An HC supply valve 19 is mounted in the exhaust pipe 16 upstream of $NO_x$ catalyst 17. In this specification, the words "upstream" and "downstream" are used as the direction along the flow of exhaust gas in the exhaust pipe 16. The invention may be applied to a diesel engine or lean burn engine discharging exhaust gas including excess oxygen. A cooling device 22 for cooling an upstream end 20 of the $NO_x$ catalyst 17 is mounted on the upstream end 20. A heating device 26 for heating a downstream end 24 of the $NO_x$, catalyst 17 is mounted on the downstream end 24. The prior cooling device using air or water may be used as the cooling device 22 of this embodiment. The prior heating device such as an electrical heater may be used as the heating device 26 of this embodiment.

An electronic control unit (ECU) 40 has a digital computer and comprises a read on memory 42 (ROM), a random access memory 43 (RAM), a central processing unit 44 (CPU), an input port 45, and an output port 46. These components are interconnected by a bidirectional bus 41. A pressure sensor 28 for generating an output voltage in proportion to an absolute pressure PM of the surge tank 10 is mounted in the surge tank 10. The output voltage of the pressure sensor 28 is input into the input port 45 via an A-D converter 47. A crank angle sensor 30 is connected to the input port 45. The crank angle sensor 30 generates an output pulse, for example, every 30° of the rotation of a crank shaft of the engine body 1. The CPU 44 calculates an engine rotational speed N of the engine body 1 on the basis of the output pulse. Further, an upstream temperature sensor 32 for generating an output voltage in proportion to the temperature of the catalyst is mounted on the upstream end 20 of the $NO_x$ catalyst 17. The output voltage of the upstream temperature sensor 32 is input into the input port 45 via an A-D converter 48. A downstream temperature sensor 34 for generating an output voltage in proportion to the temperature of the catalyst is mounted on the downstream end 24 of the $NO_x$ catalyst 17. The output voltage of the downstream temperature sensor 34 is input into the input port 45 via an A-D converter 49. The output port 46 is connected to the cooling device 22, the heating device 26 and the HC supply valve 19 via associated drive circuits 50.

Figure 30:
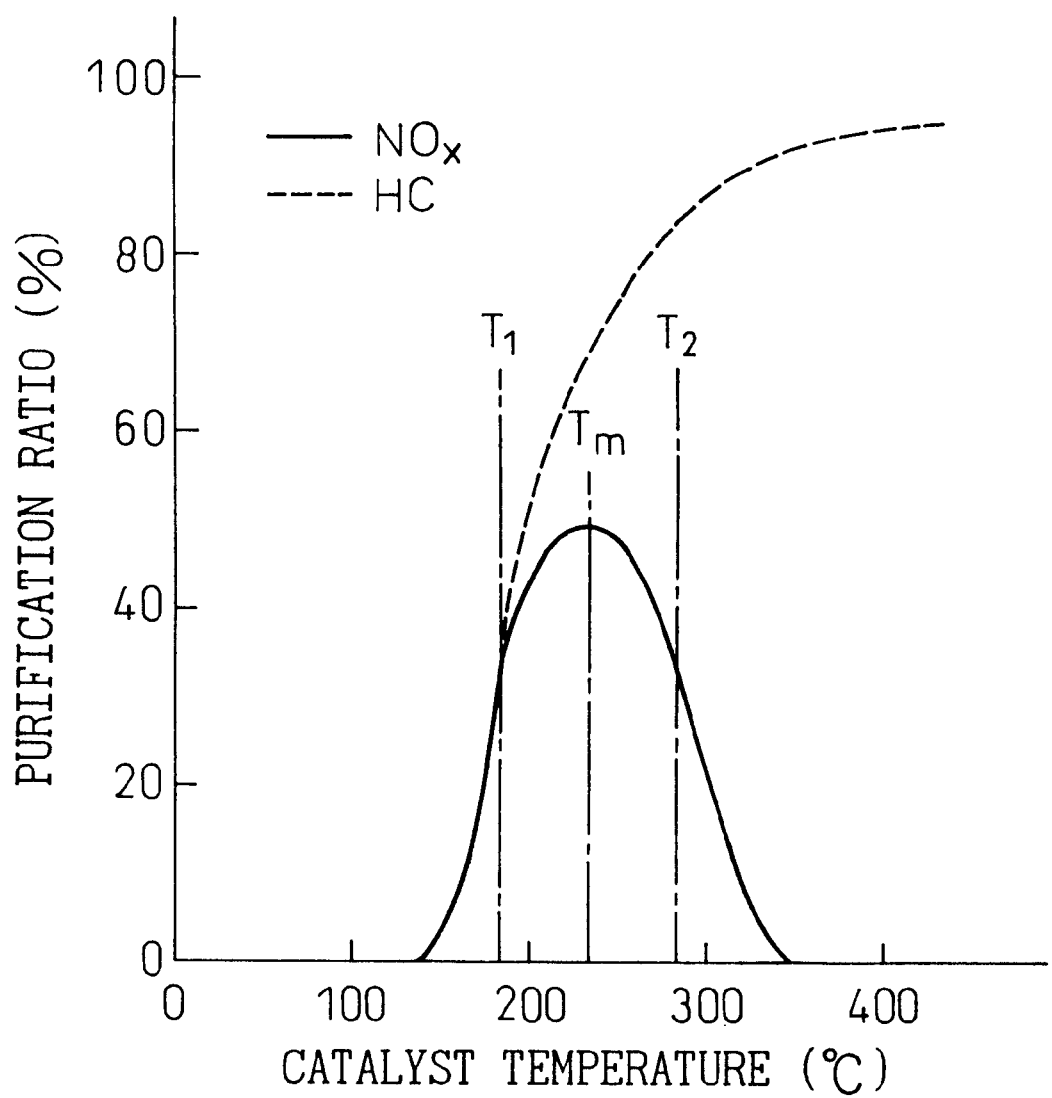
FIG. 30 is a graph indicating the relation between the temperature of the catalyst and the purification ratio for $NO_x$.

In the operation of the invention, the $NO_x$ catalyst 17 is heated up by exhaust gas as exhaust gas flows into the $NO_x$ catalyst 17 after the engine is started, resulting in the progressive increase of the temperature of the catalyst. The cooling device 22 is operated to cool the upstream end 20 of the $NO_x$ catalyst 17 when the upstream temperature sensor 32 senses the temperature of the upstream end 20 of the $NO_x$ catalyst 17 which is equal to or higher than an upstream predetermined temperature $T_1$ (see FIG. 30). Therefore, the temperature of the upstream end 20 of the $NO_x$ catalyst 17 is maintained lower than the upstream predetermined temperature $T_1$. The heating device 22 is operated to heat the downstream end 24 of the $NO_x$ catalyst 17 when the downstream temperature sensor 34 senses the temperature of the downstream end 24 of the $NO_x$ catalyst 17 which is equal to or lower than a downstream predetermined temperature $T_2$ (see FIG. 30). Therefore, the temperature of the downstream end 24 of the $NO_x$ catalyst 17 is maintained higher than the downstream predetermined temperature $T_2$.

The predetermined temperatures $T_1$ and $T_2$ are set to satisfy the relation $T_1 < T_2$ and in such a manner that the temperature $T_1$ or $T_2$ is in the temperature range in which the $NO_x$ catalyst 17 purifies exhaust gas. Preferably, the predetermined temperatures $T_1$ and $T_2$ is set to satisfy the relation $T_1 < T_m < T_2$ where $T_m$ is the optimum temperature of the catalyst which the purification ratio of $NO_x$ is highest.

The HC supply valve supplies an amount of HC corresponding to the amount of $NO_x$ in exhaust gas suitable to sufficiently purify $NO_x$. The amount of $NO_x$ in exhaust gas is, for example, estimated as follows. The amount of $NO_x$ in exhaust gas discharged from the engine per unit time is increased as the engine rotational speed N is increased. Therefore, the amount of $NO_x$ discharged from the engine per unit time is increased as the engine rotational speed N is increased. Further, the amount of exhaust gas discharged from each combustion chamber 3 is increased and the combustion temperature is increased as a load of the engine is increased, i.e., as the absolute pressure PM in the surge tank 10 is increased. Therefore, the amount of $NO_x$ is increased as the load of the engine is increased, i.e., as the absolute pressure PM in the surge tank 10 is increased.

Figure 2:
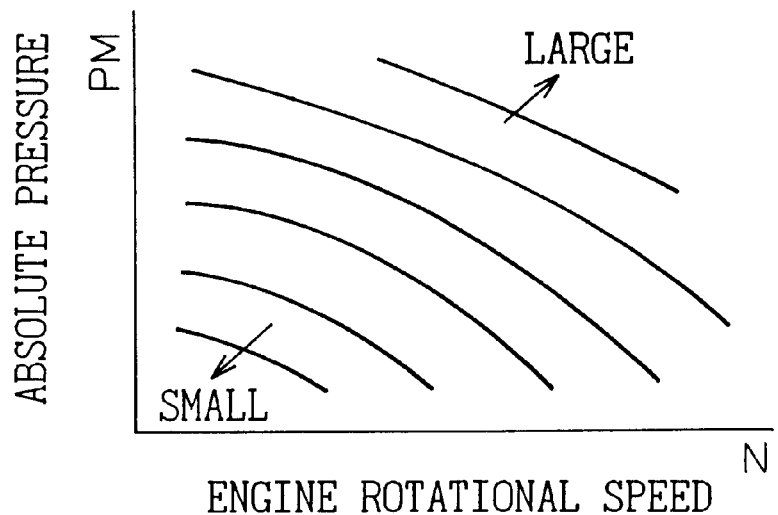
FIG. 2 is a graph of the amount of $NO_x$ discharged from the engine body.
Figure 3:
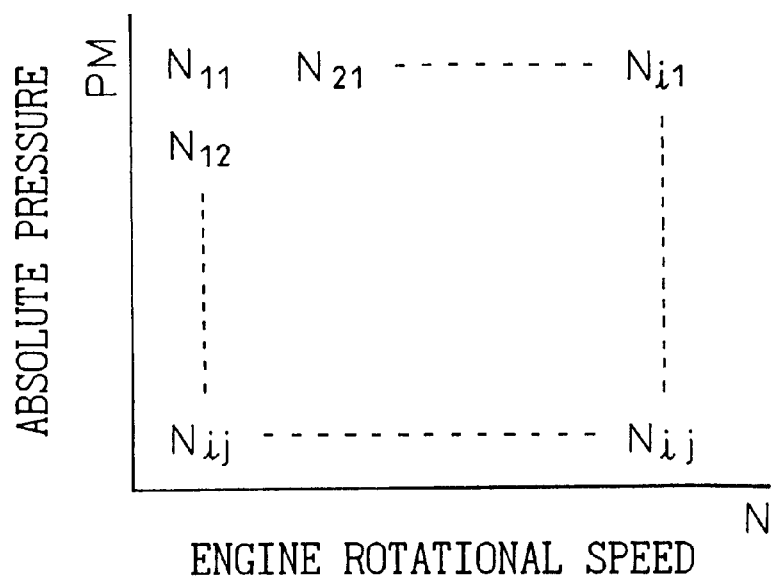
FIG. 3 is a map for presuming the amount of $NO_x$ discharged from the engine body.

FIG. 2 shows the relation among the amount of $NO_x$ per unit time discharged from the engine, the absolute pressure PM of the surge tank 10, and the engine rotational speed N as found by experiment. In FIG. 2, each of the curves shows the identical amount of $NO_x$. As shown in FIG. 2, the amount of $NO_x$ discharged from the engine per unit time is increased as the absolute pressure of the surge tank 10 is increased, and/or the engine rotational speed N is increased. Note that the data of the amount of $NO_x$ shown in FIG. 2 is stored in the ROM 42 in advance in the form of a map as shown in FIG. 3.

Figure 4:
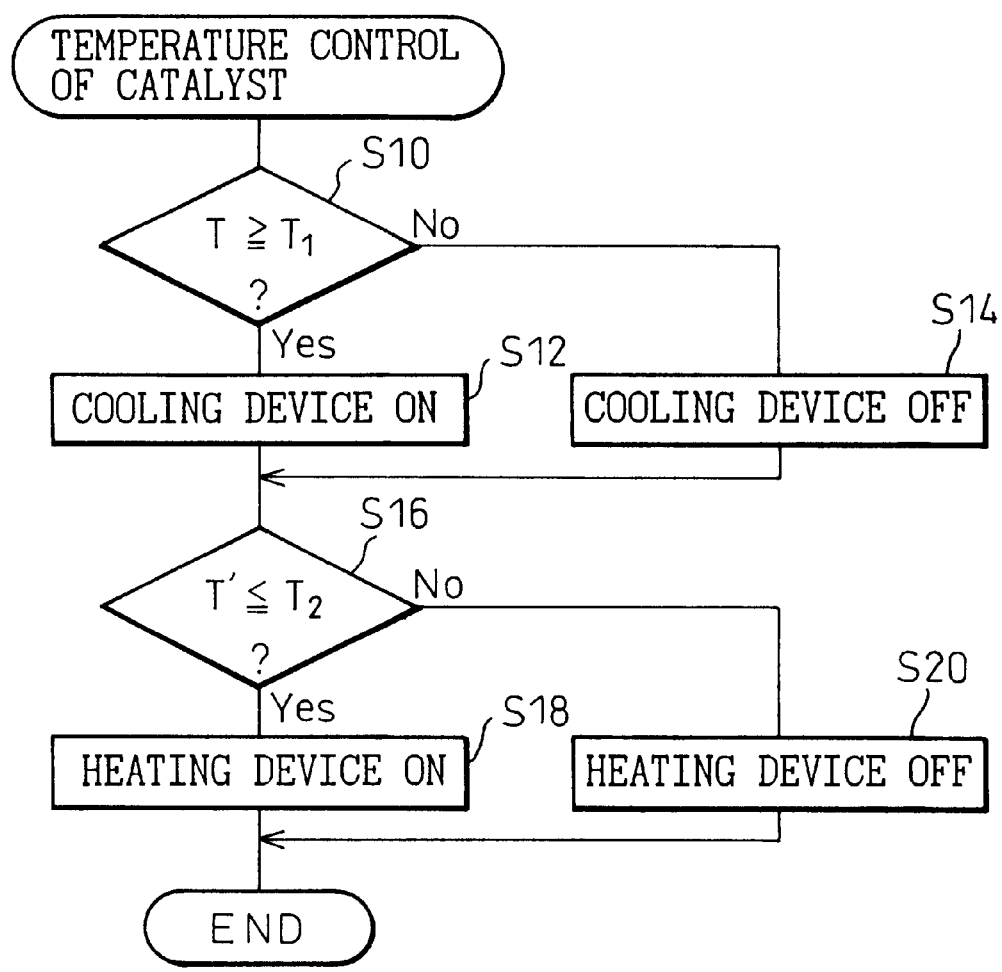
FIG. 4 is a flowchart of the operation of the first embodiment according to the invention.

FIG. 4 is a flowchart of the operation of the first embodiment according to the invention. At step S10, it is judged if the temperature T of the upstream end 20 of the $NO_x$ catalyst 17 is equal to or higher than the upstream predetermined temperature $T_1$. When the temperature T of the upstream end 20 of the $NO_x$ catalyst 17 is equal to or higher than the upstream predetermined temperature $T_1$, the routine proceeds to step S12, where the cooling device 22 is operated (ON) and the routine proceeds to step S16. On the other hand, when the temperature T of the upstream end 20 of the $NO_x$ catalyst 17 is lower than the upstream predetermined temperature $T_1$, the routine proceeds to step S14, where the cooling device 22 is stopped (OFF) and the routine proceeds to step S16.

Next, at step S16, it is judged if the temperature T' of the downstream end 24 of the $NO_x$ catalyst 17 is equal to or lower than the downstream predetermined temperature $T_2$. When the temperature T' of the downstream end 24 of the $NO_x$ catalyst 17 is equal to or lower than the upstream predetermined temperature $T_2$, the routine proceeds to step S18, where the heating device 26 is operated (ON) and the processing cycle is ended. On the other hand, when the temperature T' of the downstream end 24 of the $NO_x$ catalyst 17 is higher than the upstream predetermined temperature $T_2$, the routine proceeds to step S20, where the heating device 26 is stopped (OFF) and the processing cycle is ended.

A temperature gradient is produced in the $NO_x$ catalyst from the upstream end toward the downstream end by controlling the upstream and downstream temperatures of the $NO_x$ catalyst as above described. Therefore, the temperature of at least a portion of the $NO_x$ catalyst is within an optimum catalyst temperature range. Where the optimum catalyst temperature range is defined in such a manner a purification ratio of exhaust gas is more than a predetermined ratio within the range. When the heat produced by the reaction between $NO_x$ and HC heats a portion of the catalyst which is within the optimum catalyst temperature range to raise the temperature of the portion beyond the optimum catalyst temperature range, the temperature of the upstream end of the $NO_x$ catalyst is maintained lower than the optimum catalyst temperature range. Therefore, the temperature of a portion of the $NO_x$ catalyst between the portion heated beyond the optimum catalyst temperature range and the upstream end of the $NO_x$ catalyst is within the optimum catalyst temperature range. Consequently, a high purification ratio of $NO_x$ can be obtain since the temperature of at least a portion of the $NO_x$ catalyst is always within the optimum catalyst temperature range. According to the invention, the high purification ratio of $NO_x$ can be easily obtained by a simple control without a complicated control for maintaining the temperature of the catalyst within the small optimum catalyst temperature range.

Figure 5:
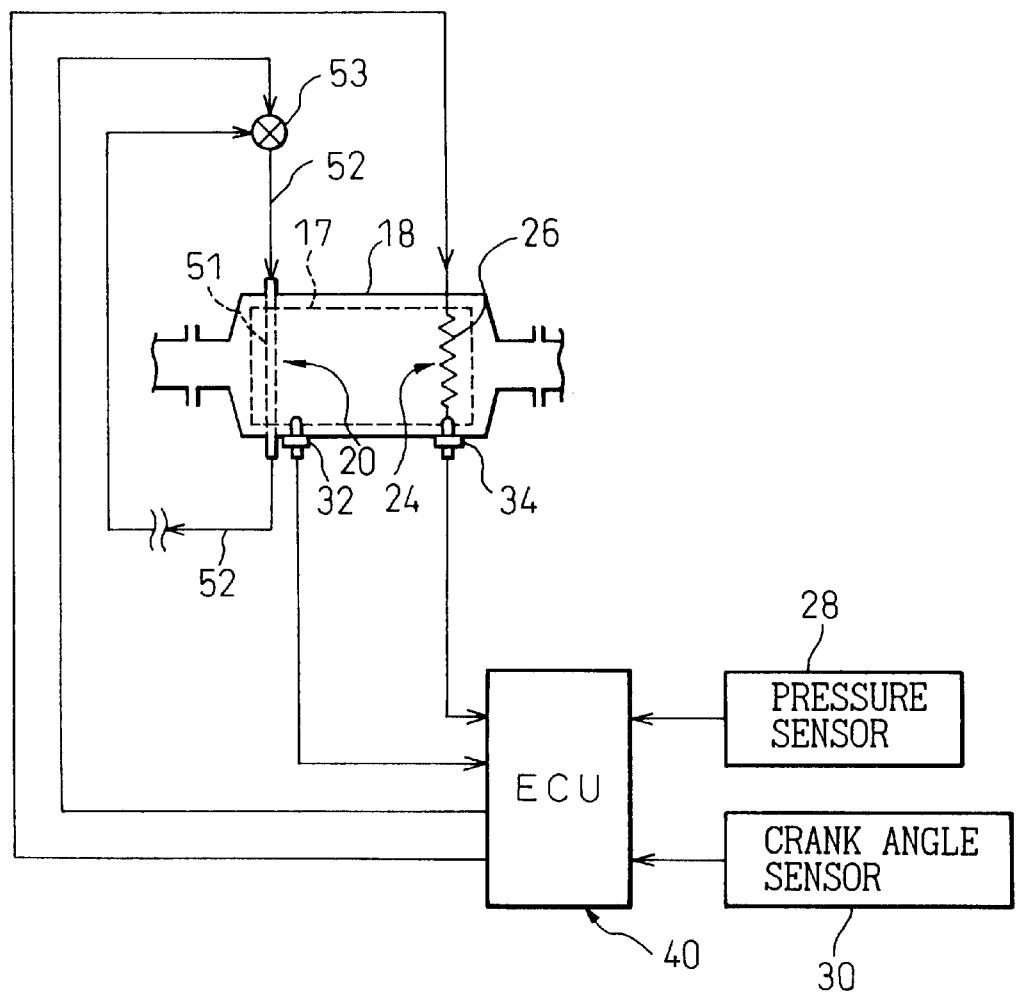
FIG. 5 is a view of the second embodiment of the engine with the exhaust gas purification device according to the invention.

FIG. 5 is a view of the second embodiment of the engine with the exhaust gas purification device according to the invention. In this embodiment, coolant such as cooling water flows through a coolant passageway 51 arranged in the upstream end 20 of the $NO_x$ catalyst 17 to cool the upstream end 20 of the $NO_x$ catalyst 17. It is advantageous to commonly use some of the cooling water used to cool the engine as cooling water of this embodiment. The coolant passageway 51 is connected to a coolant conduit 52. A control valve 53 is arranged in the coolant conduit 52 upstream of the coolant passageway 51. The control valve 53 controls the flow of the cooling water into the coolant passageway 51. The control valve 53 is connected to the output port of the ECU 40, and is controlled on basis of the temperature of the upstream end of the $NO_x$ catalyst 17. Note that the components of the second embodiment other than the coolant passageway, the coolant conduit and the control valve instead of the cooling device is the same as that of the first embodiment and that the ECU referenced by 40 in FIG. 5 is the same as the ECU 40 in FIG. 1.

Figure 6:
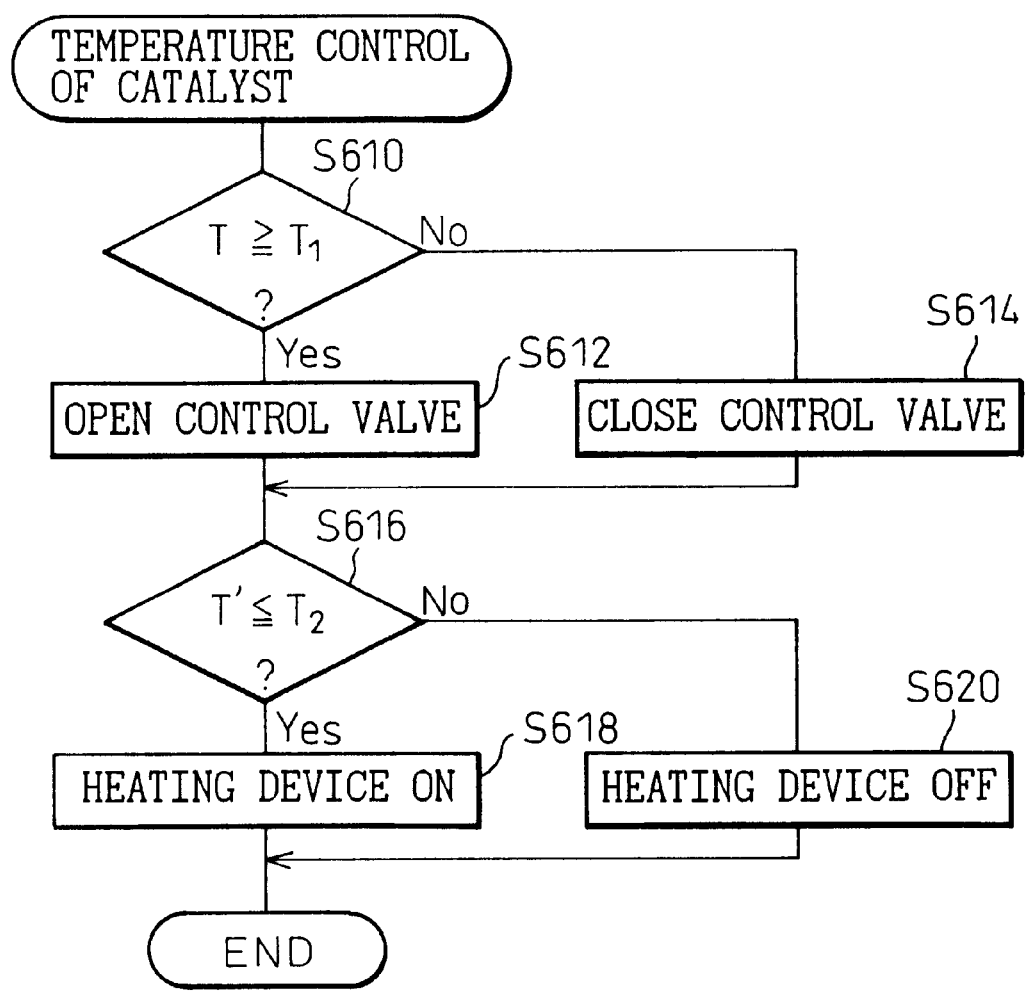
FIG. 6 is a flowchart of the temperature control for the catalyst of the second embodiment according to the invention.

FIG. 6 is a flowchart of the operation of the second embodiment according to the invention. At step S610, it is judged if the temperature T of the upstream end 20 of the $NO_x$ catalyst 17 is equal to or higher than the upstream predetermined temperature $T_1$. When the temperature T of the upstream end 20 of the $NO_x$ catalyst 17 is equal to or higher than the upstream predetermined temperature $T_1$, the routine proceeds to step S612, where the control valve 53 is opened and the routine proceeds to step S616. On the other hand, when the temperature T of the upstream end 20 of the $NO_x$ catalyst 17 is lower than the upstream predetermined temperature $T_1$, the routine proceeds to step S614, where the control valve 53 is closed and the routine proceeds to step S616.

Next, at step S616, it is judged if the temperature T' of the downstream end 24 of the $NO_x$ catalyst 17 is equal to or lower than the downstream predetermined temperature $T_2$. When the temperature T' of the downstream end 24 of the $NO_x$ catalyst 17 is equal to or lower than the upstream predetermined temperature $T_2$, the routine proceeds to step S618, where the heating device 26 is operated (ON) and the processing cycle is ended. On the other hand, when the temperature T' of the downstream end 24 of the $NO_x$ catalyst 17 is higher than the upstream predetermined temperature $T_2$, the routine proceeds to step S620, where the heating device 26 is stopped (OFF) and the processing cycle is ended.

According to this embodiment, in addition to the effect of the first embodiment, there is an effect that the upstream end of the $NO_x$ catalyst can be cooled with small cost since the cooling water used to cool the engine is commonly used as the coolant of this embodiment.

Figure 7:
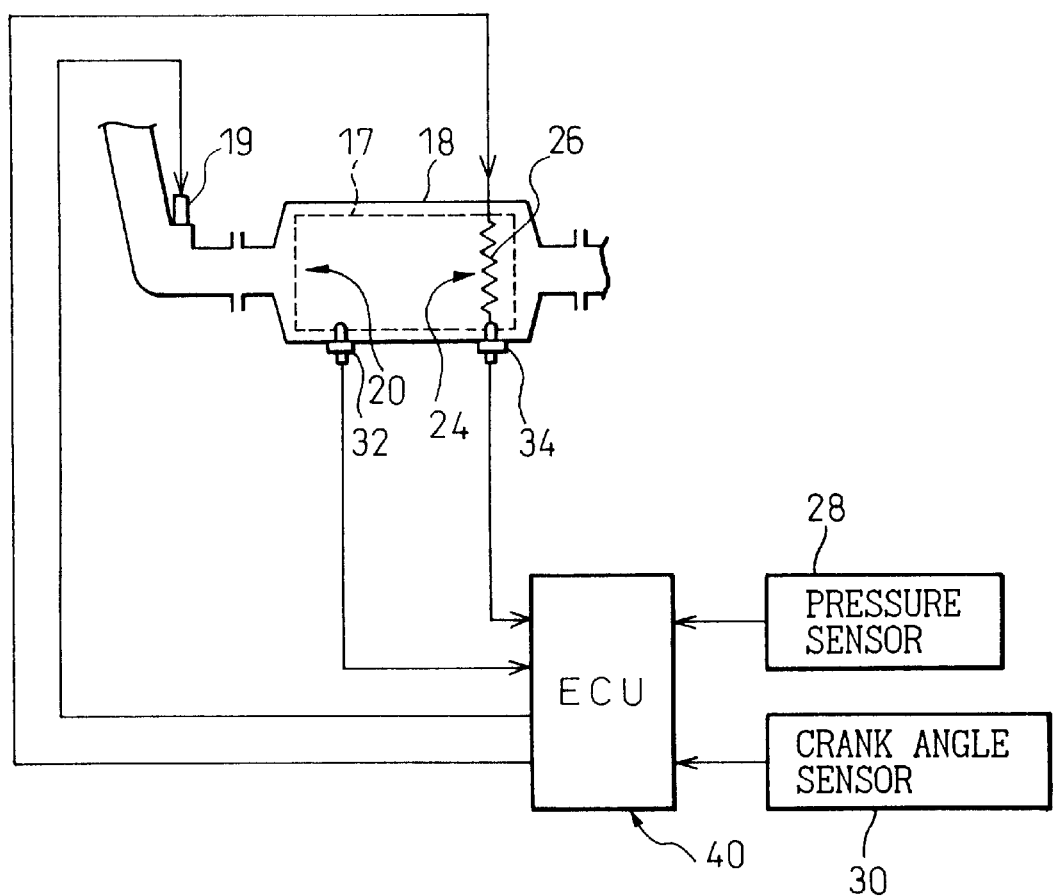
FIG. 7 is a view of the third embodiment of the engine with the exhaust gas purification device according to the invention.

FIG. 7 is a view of the third embodiment of the engine with the exhaust gas purification device according to the invention. In this embodiment an HC supply period, i.e., an amount of HC supplied from the HC supply valve 19 such as means for supplying reducing agent arranged upstream of the $NO_x$ catalyst 17 is controlled to cool the upstream end 20 of the $NO_x$ catalyst 17. In this embodiment, the HC supply valve 19 serves as the cooling device. Note that the components of the third embodiment other than the HC supply valve used as the cooling device is the same as that of the first embodiment and that the ECU referenced by 40 in FIG. 7 is the same as the ECU 40 in FIG. 1. When the temperature T of the upstream end 20 of the $NO_x$ catalyst 17 is equal to or higher than the upstream predetermined temperature $T_1$, the opening of the HC supply valve 19 for the predetermined period $t_0/n_1$ is performed $n_1$ times. $t_0$ is the period for opening the HC supply valve to supply the amount of HC needed for the purifying reaction of the $NO_x$ catalyst in the engine condition during a certain predetermined period, is estimated by the same way as the first embodiment and is stored in the ROM 42 in advance in the form of a map. $n_1$ is the number of the opening of the HC supply valve during the certain predetermined period. Therefore, $t_0/n_1$ is the period for opening the HC supply valve 19 once. For the opening period $t_0/n_1$, the amount of HC can be supplied to cool the upstream end 20 of the $NO_x$ catalyst 17 by attaching a liquid HC to the upstream end 20 of the $NO_x$ catalyst 17 and to further cool the upstream end 20 by evaporating or heat-resolving the attached HC. When the temperature T of the upstream end 20 of the $NO_x$ catalyst 17 is lower than the upstream predetermined temperature $T_1$, the opening of the HC supply valve 19 for the predetermined period $t_0/n_2$ is performed $n_2$ times. Similar to $n_1$, $n_2$ is the number of the opening of the HC supply valve during the certain predetermined period.

The amount of HC supplied from the HC supply valve by opening, for the predetermined period $t_0/n_2$, the HC supply valve $n_2$ times is sufficient to purify the exhaust gas in the $NO_x$ catalyst 17 for the certain predetermined period. However, $n_2$ is set in such a manner that the amount of HC supplied from the HC supply valve by opening the HC supply valve for the predetermined period $t_0/n_2$ is not sufficient to cool the upstream end of the $NO_x$ catalyst 17. In consideration of the increase of the purification ratio of $NO_x$, it is preferable to supply HC once and as little as possible. Therefore, since the cooling of the upstream end of the $NO_x$ catalyst is not necessary when the temperature T of the upstream end of the $NO_x$ catalyst is lower than the upstream predetermined temperature $T_1$, $n_2$ is larger than $n_1$.

Further, although the larger the amount of HC, supplied once from the HC supply valve, is, the more the HC can cool the upstream end of the $NO_x$ catalyst, too much HC supplied once from the HC supply valve passes through the $NO_x$ catalyst 17 without reacting with $NO_x$. Therefore, $n_1$ should be smaller than the number such that the amount of HC supplied once from the HC supply valve cannot pass through the $NO_x$ catalyst 17 without reacting with $NO_x$. The operation of the heating device 26 is the same as the first embodiment.

Figure 8:
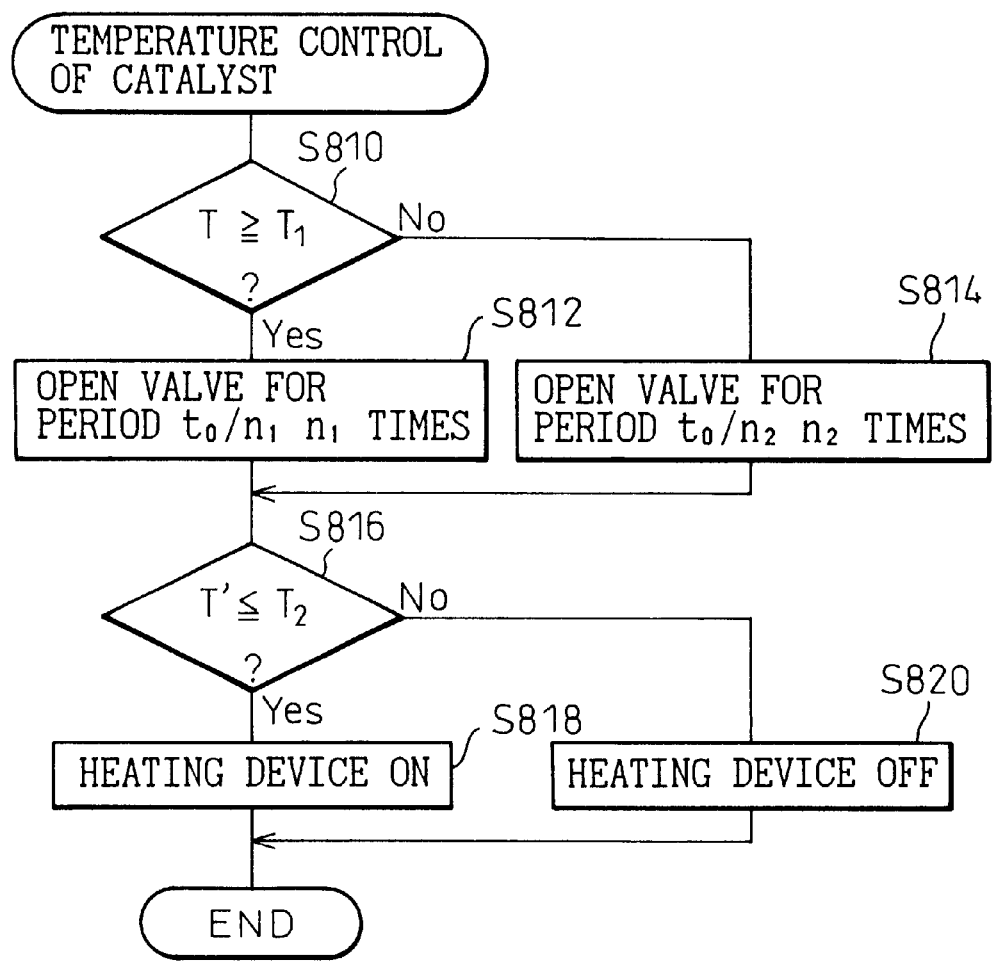
FIG. 8 is a flowchart of the temperature control for the catalyst of the third embodiment according to the invention.

FIG. 8 is a flowchart of the operation of the third embodiment according to the invention. At step S810, it is judged if the temperature T of the upstream end 20 of the $NO_x$ catalyst 17 is equal to or higher than the upstream predetermined temperature $T_1$. When the temperature T of the upstream end 20 of the $NO_x$ catalyst 17 is equal to or higher than the upstream predetermined temperature $T_1$, the routine proceeds to step S812, where the opening of the HC supply valve 19 for the predetermined period $t_0/n_1$ is performed $n_1$ times and the routine proceeds to step S816. On the other hand, when the temperature T of the upstream end 20 of the $NO_x$ catalyst 17 is lower than the upstream predetermined temperature $T_1$, the routine proceeds to step S814, where the opening of the HC supply valve 19 for the predetermined period $t_0/n_2$ is performed $n_2$ times and the routine proceeds to step S816.

Next, at step S816, it is judged if the temperature T' of the downstream end 24 of the $NO_x$ catalyst 17 is equal to or lower than the downstream predetermined temperature $T_2$. When the temperature T' of the downstream end 24 of the $NO_x$ catalyst 17 is equal to or lower than the upstream predetermined temperature $T_2$, the routine proceeds to step S818, where the heating device 26 is operated (ON) and the processing cycle is ended. On the other hand, when the temperature T' of the downstream end 24 of the $NO_x$ catalyst 17 is higher than the upstream predetermined temperature $T_2$, the routine proceeds to step S820, where the heating device 26 is stopped (OFF) and the processing cycle is ended.

According to this embodiment, in addition to the effect of the first embodiment, there is an effect that the exhaust gas purification device with a simple structure is provided with small cost without adding another cooling device since the HC supply valve arranged for purifying the exhaust gas is used as the cooling device which cools the upstream end of the $NO_x$ catalyst.

Figure 9:
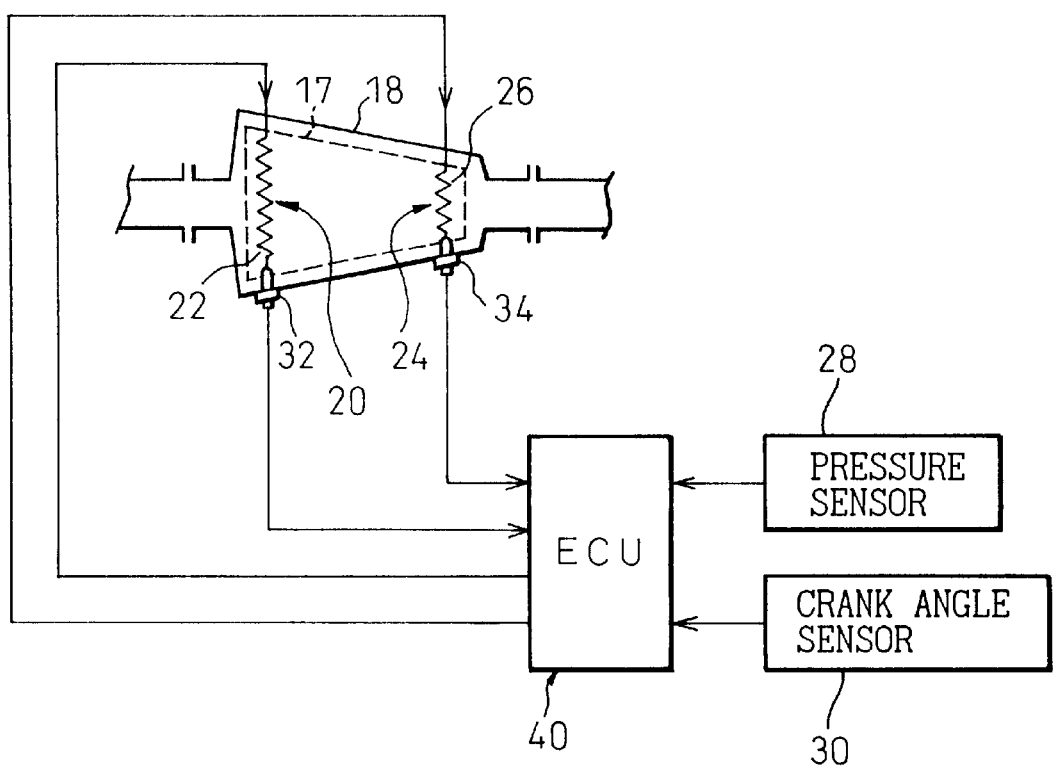
FIG. 9 is a view of the fourth embodiment of the engine with the exhaust gas purification device according to the invention.

FIG. 9 is a view of the fourth embodiment of the engine with the exhaust gas purification device according to the invention. In this embodiment, the cross sectional area in the downstream side of the $NO_x$ catalyst 17 is smaller than that in the upstream side of the $NO_x$ catalyst 17. The purifying reaction of $NO_x$ generates heat in the $NO_x$ catalyst 17. The reaction heat entrained in the flow of the exhaust gas is transferred toward the downstream side of the $NO_x$ catalyst 17, and then is concentrated in the downstream end 24 of the $NO_x$ catalyst 17. Therefore, typically, the temperature of the upstream end 20 of the $NO_x$ catalyst 17 is equal to or higher than that of the downstream 24 of the $NO_x$ catalyst 17. In this embodiment, the cross sectional area in the downstream side of the $NO_x$ catalyst 17 is smaller than that in the upstream side of the $NO_x$ catalyst 17 to reduce the heat capacity in the downstream side. Therefore, the temperature of the downstream end 24 of the $NO_x$ catalyst 17 is always maintained at a higher level than the upstream end 20 of the $NO_x$ catalyst 17. Thus, the number of the operation of the heating device 26 to maintain the temperature of the downstream end 24 above the downstream predetermined temperature $T_2$ is reduced so that the life time of the heating device is extended. Note that the components of the fourth embodiment other than the area of the cross section of the $NO_x$ catalyst is the same as that of the first embodiment and that the ECU reference by 40 is in FIG. 9 is the same as the ECU 40 in FIG. 1.

Figure 10:
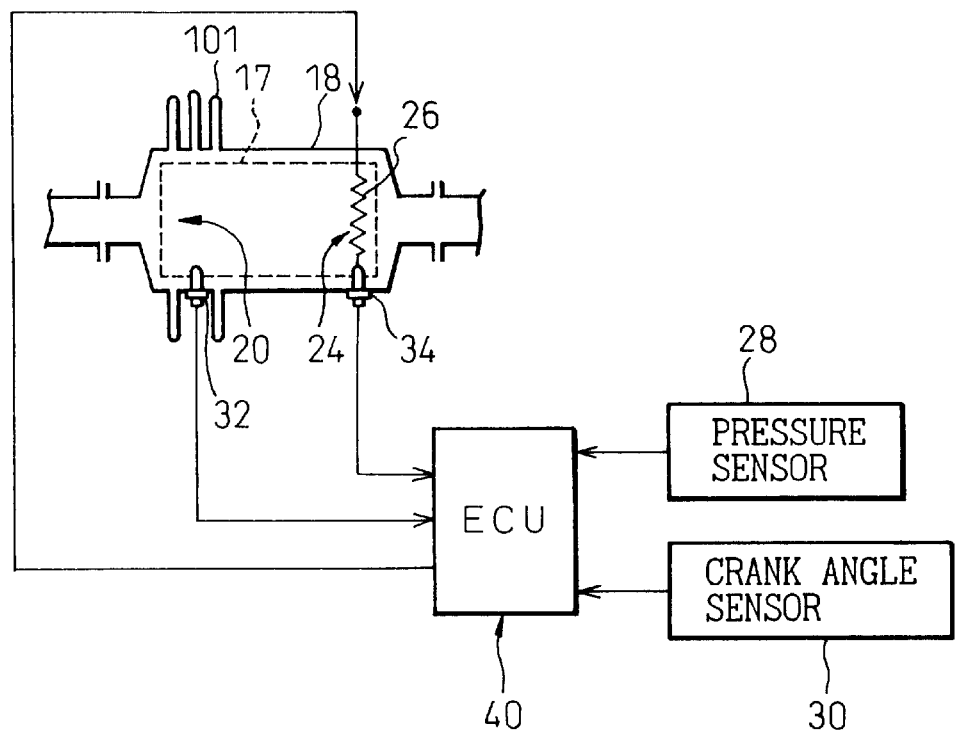
FIG. 10 is a view of the fifth embodiment of the engine with the exhaust gas purification device according to the invention.

FIG. 10 is a view of the fifth embodiment of the engine with the exhaust gas purification device according to the invention. In this embodiment, a cooling fin 101 is arranged on the outer periphery of the casing 18 surrounding the upstream end 20 of the $NO_x$ catalyst 17. The cooling fin 101 cools the upstream end 20 of the $NO_x$ catalyst 17. In this embodiment, the cooling fin 101 corresponds to the cooling device of the first embodiment. The temperature of the upstream end 20 of the $NO_x$ catalyst 17 is maintained under the upstream predetermined temperature $T_1$ by the cooling fin 101. Note that the components of the fifth embodiment other than the cooling fin used as the cooling device is the same as that of the first embodiment and that the ECU referenced by 40 in FIG. 10 is the same as the ECU 40 in FIG. 1.

Figure 11:
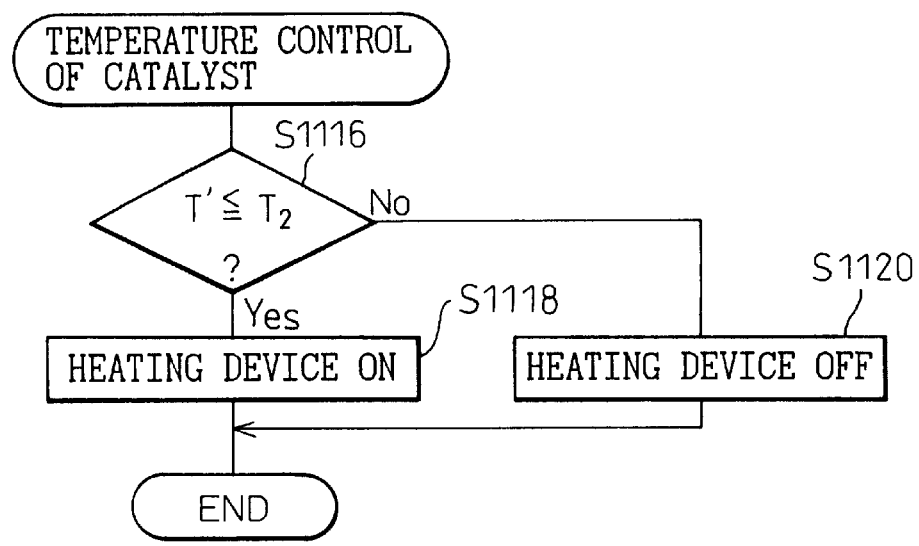
FIG. 11 is a flowchart of the temperature control for the catalyst of the fifth embodiment according to the invention.

FIG. 11 is a flowchart of the operation of the fifth embodiment according to the invention. At step S1116, it is judged if the temperature T' of the downstream end 24 of the $NO_x$ catalyst 17 is equal to or lower than the downstream predetermined temperature $T_2$. When the temperature T' of the downstream end 24 of the $NO_x$ catalyst 17 is equal to or lower than the upstream predetermined temperature $T_2$, the routine proceeds to step S1118, where the heating device 26 is operated (ON) and the processing cycle is ended. On the other hand, when the temperature T' of the downstream end 24 of the $NO_x$ catalyst 17 is higher than the upstream predetermined temperature $T_2$, the routine proceeds to step S1120, where the heating device 26 is stopped (OFF) and the processing cycle is ended.

According to this embodiment, in addition to the effect of the first embodiment, there is an effect that the exhaust gas purification device with a simple structure is provided with small cost since the cooling fin is used as the cooling device which cools the upstream end of the $NO_x$ catalyst.

Figure 12:
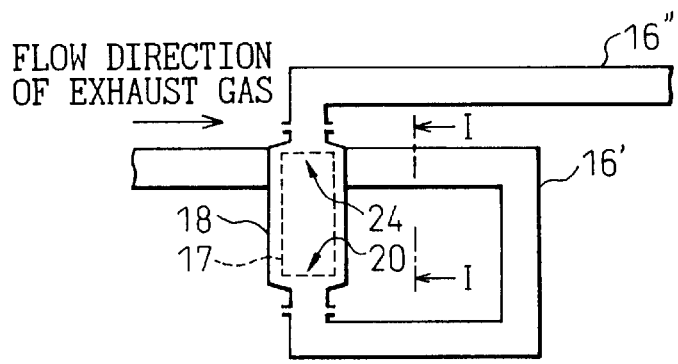
FIG. 12 is a view of the sixth embodiment of the engine with the exhaust gas purification device according to the invention.
Figure 13:
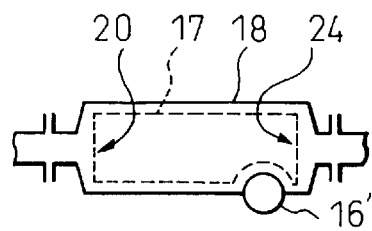
FIG. 13 is a side view along the line I—I of FIG. 12.

FIG. 12 is a view of the sixth embodiment of the engine with the exhaust gas purification device according to the invention. FIG. 13 is a side view along the line I—I of FIG. 12. In this embodiment, an upstream exhaust pipe 16' upstream of the $NO_x$ catalyst 17 is in contact with the downstream end 24 of the $NO_x$ catalyst 17. The temperature of the exhaust gas flowing through the upstream exhaust pipe 16' is equal to or higher than the downstream predetermined temperature $T_2$. The heat of the hot exhaust gas flowing through the upstream exhaust pipe 16' is transferred to the downstream end 24 of the $NO_x$ catalyst 17 via a wall of the upstream exhaust pipe 16'. Therefore, the temperature of the downstream end 24 of the $NO_x$ catalyst 17 is raised up above the downstream predetermined temperature $T_2$. The temperature of the exhaust gas flowing into the upstream end 20 of the $NO_x$ catalyst 17 is equal to or lower than the upstream predetermined temperature $T_1$ since the heat of the exhaust gas is transferred to the downstream end 24 of the $NO_x$ catalyst 17 and is discharged before the exhaust gas flows into the $NO_x$ catalyst 17. Therefore, the temperature of the upstream end 20 is maintained lower than the upstream predetermined temperature $T_1$. In other words, a heat exchanger is constituted by the downstream end 24 of the $NO_x$ catalyst 17 and the wall of the upstream exhaust pipe 16' which is in contact with the downstream end 24 upstream of the $NO_x$ catalyst 17. Note that the components of the sixth embodiment other than that described about FIG. 12 are the same as that of the first embodiment.

According to this embodiment, it is possible to form a temperature gradient between the upstream end and the downstream end without a heating or cooling device.

Figure 14:
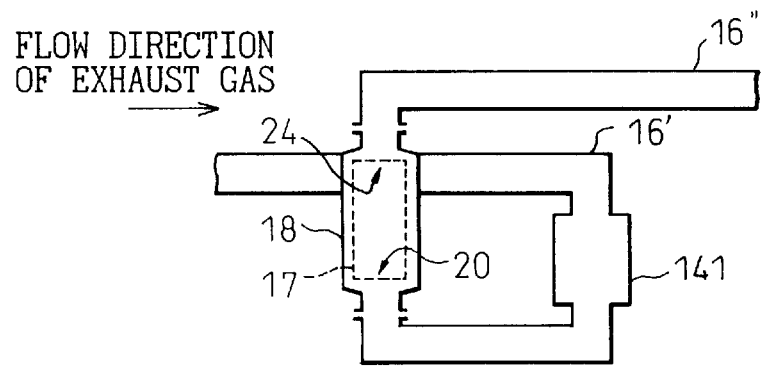
FIG. 14 is a view of the seventh embodiment of the engine with the exhaust gas purification device according to the invention.

FIG. 14 is a view of the seventh embodiment of the engine with the exhaust gas purification device according to the invention. In this embodiment, in addition to the sixth embodiment, another heat exchanger such as a muffler 141 is arranged in the upstream exhaust pipe 16' between the portion of the upstream exhaust pipe 16' which is in contact with the downstream end 24 of the $NO_x$ catalyst 17 and the $NO_x$ catalyst 17. The temperature of the exhaust gas flowing into the upstream end 20 of the $NO_x$ catalyst 17 is equal to or lower than that of the exhaust gas in the sixth embodiment since the heat of the exhaust gas is discharged when the exhaust gas passes through the muffler 141. Note that the components of the seventh embodiment other than the muffler is the same as that of the sixth embodiment.

According to this embodiment, in addition to the effect of the sixth embodiment, there is an effect that the temperature of the upstream end of the $NO_x$ catalyst can be surely maintained below the upstream predetermined temperature.

Figure 15:
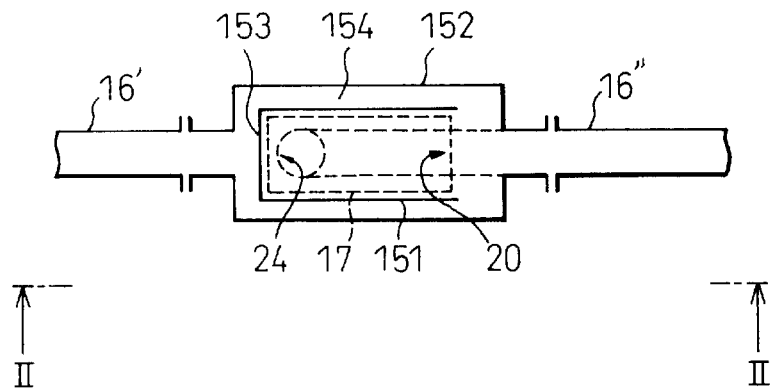
FIG. 15 is a view of the eighth embodiment of the engine with the exhaust gas purification device according to the invention.
Figure 16:
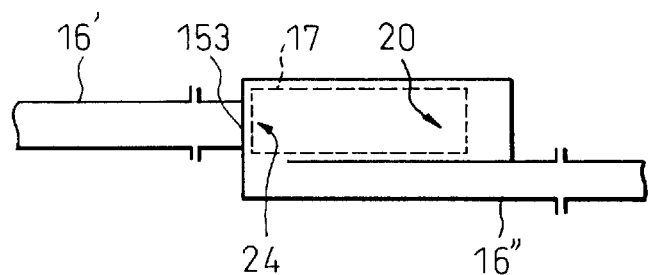
FIG. 16 is a side view along the line II—II of FIG. 15.

FIG. 15 is a view of the eighth embodiment of the engine with the exhaust gas purification device according to the invention. FIG. 16 is a side view along the line II—II of FIG. 15. In this embodiment, a portion of the exhaust pipe 16 is formed as a double-pipe structure, constituted by an inner pipe 151 and an outer pipe 152. The $NO_x$ catalyst 17 is arranged in the inner pipe 151. The exhaust pipe 16' is connected to the outer pipe 152 at the left side of the double-pipe structure in FIG. 15 and is in communication with a space 154 defined between the inner pipe 151 and the outer pipe 152. The space 154 is in communication with the inner pipe 151 at the right side of the double-pipe structure in FIG. 15. Further, the inner pipe 151 is in communication with the downstream exhaust pipe 16" at the left side of the double-pipe structure. Therefore, the exhaust gas flows into the inner pipe 151, i.e., the $NO_x$ catalyst 17 via the space 154 from the upstream exhaust pipe 16' and discharges to the downstream exhaust pipe 16". In this embodiment, the flow direction of the exhaust gas flowing through the space 154 is opposite to the flow direction of the exhaust gas flowing through the inner pipe 151. Note that the components of the eighth embodiment other than that described regarding FIGS. 15 and 16 are the same as that of the sixth embodiment.

According to this embodiment, the hot exhaust gas flowing from the upstream exhaust pipe 16' into the space 154 is in contact with the downstream end wall 153 of the inner pipe 151. Therefore, as is the sixth embodiment, the temperature of the downstream end 24 of the $NO_x$ catalyst 17 is raised up higher than the downstream predetermined temperature $T_2$. Further, the temperature of the exhaust gas flowing into the upstream end 20 of the $NO_x$ catalyst 17 is decreased since the heat of the exhaust gas is exchanged at the downstream end wall 153 of the inner pipe 151 and is discharged before the exhaust gas flows into the $NO_x$ catalyst 17. Therefore, the temperature of the upstream end 20 is maintained below the upstream predetermined temperature $T_1$. Moreover, the exhaust gas purification device according to this embodiment is compact since the space occupied by the pipes is smaller than that in the sixth embodiment.

Figure 17:
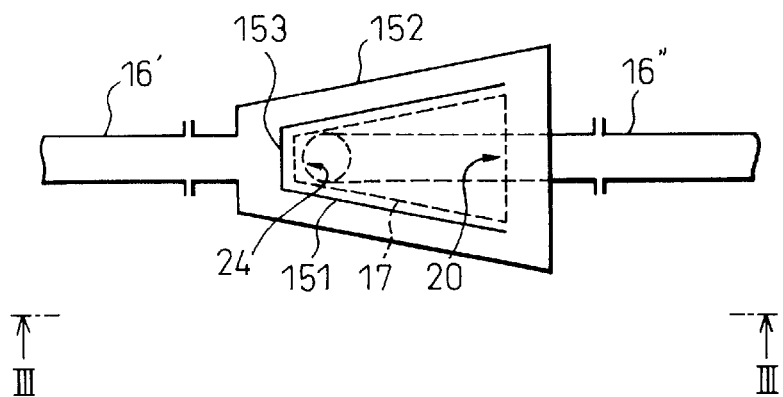
FIG. 17 is a view of the ninth embodiment of the engine with the exhaust gas purification device according to the invention.
Figure 18:
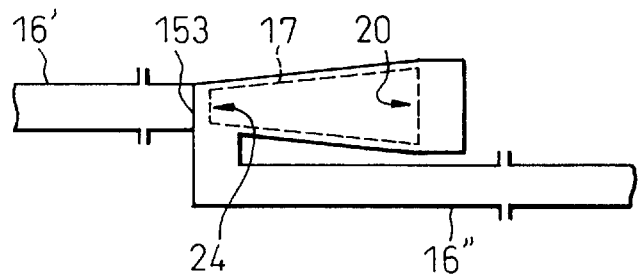
FIG. 18 is a side view along the line III—III of FIG. 17.

FIG. 17 is a view of the ninth embodiment of the engine with the exhaust gas purification device according to the invention. FIG. 18 is a side view along the line III—III of FIG. 17. In this embodiment, in addition to the ninth embodiment, the cross sectional area in the downstream side of the $NO_x$ catalyst 17 is smaller than that in the upstream side of the $NO_x$ catalyst 17. According to this embodiment, there are effects including the effects of the eighth embodiment and fourth embodiment.

Figure 19:
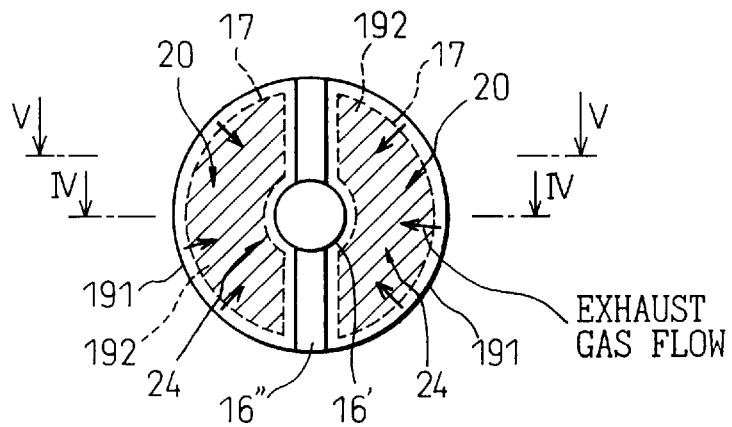
FIG. 19 is a transverse cross section of the tenth embodiment of the engine with the exhaust gas purification device according to the invention.
Figure 20:
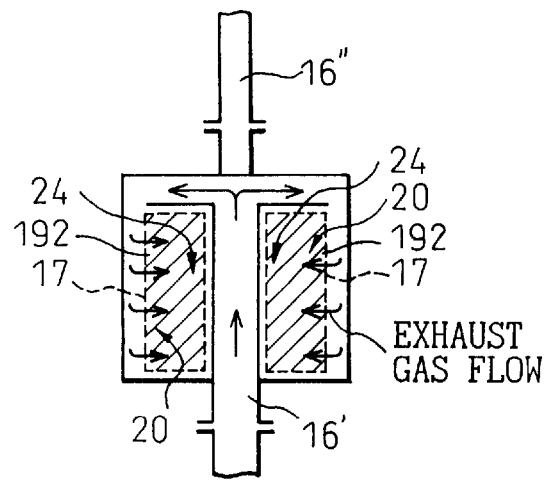
FIG. 20 is a cross section along the line IV—IV of FIG. 19.
Figure 21:
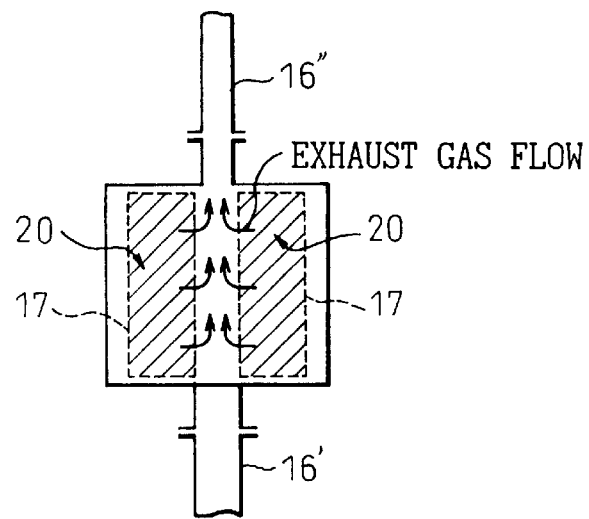
FIG. 21 is a cross section along the line V—V of FIG. 19.

FIG. 19 is a transverse cross section of the tenth embodiment of the engine with the exhaust gas purification device according to the invention. FIG. 20 is a cross section along the line IV—IV of FIG. 19. FIG. 21 is a cross section along the line V—V of FIG. 19. In this embodiment, the exhaust gas purification device is a double-pipe structure, comprising an inner pipe, i.e., the upstream exhaust pipe 16', and an outer pipe 191 surrounding the upstream exhaust pipe 16'. A space 192 is defined between the upstream exhaust pipe 16' and the outer pipe 191. The upstream exhaust pipe 16' is connected to the space 192 at the upper side of the double-pipe structure in FIG. 20. The space 192 is connected to the downstream exhaust pipe 16" at the central area of the double-piped structure in FIG. 21. A pair of semi-cylindrical $NO_x$ catalyst 17 is arranged in the space 192 to surround the upstream exhaust pipe 16'. Referring to FIGS. 20 and 21, the exhaust gas flows from the upstream exhaust pipe 16' via the space 192 and the $NO_x$ catalyst 17 to the downstream exhaust pipe 16". Referring to FIG. 19, the exhaust gas flows from an outer cylindrical periphery of the $NO_x$ catalyst 17 into the $NO_x$ catalyst 17, and is discharged from an inner planer face of the $NO_x$ catalyst 17 to the downstream exhaust pipe 16". Note that the components of the tenth embodiment other than that described regarding FIGS. 19, 20 and 21 are the same as that of the sixth embodiment.

According to this embodiment, similar to the sixth embodiment, the heat of the hot exhaust gas flowing through the upstream exhaust pipe 16' is transferred to the downstream end 24 of the $NO_x$ catalyst 17. Therefore, the temperature of the downstream end 24 is raised up higher than the downstream predetermined temperature $T_2$. Further, the temperature of the exhaust gas flowing into the $NO_x$ catalyst 17 is decreased since the heat of the exhaust gas is transferred to the downstream end 24 of the $NO_x$ catalyst 17 and is discharged before the exhaust gas flows into the downstream end 24 of the $NO_x$ catalyst 17. Therefore, the temperature of the upstream end 20 of the $NO_x$ catalyst 17 is maintained lower than the upstream predetermined temperature $T_1$.

Figure 22:
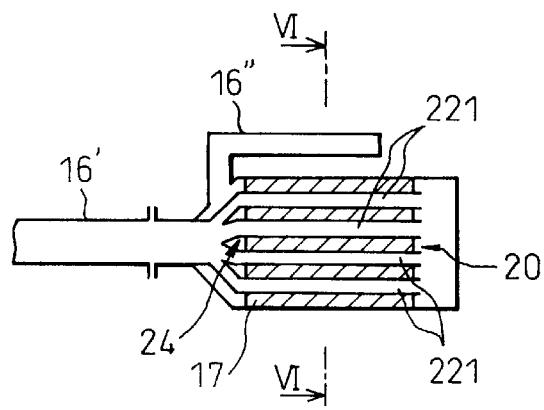
FIG. 22 is a view of the eleventh embodiment of the engine with the exhaust gas purification device according to the invention.
Figure 23:
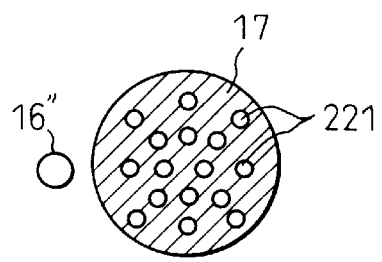
FIG. 23 is a side view along the line VI—VI of FIG. 22.

FIG. 22 is a view of the eleventh embodiment of the engine with the exhaust gas purification device according to the invention. FIG. 23 is a side view along the line VI—VI of FIG. 22. In this embodiment, many narrow pipes 221 each having a small diameter are arranged in the $NO_x$ catalyst 17 so that the narrow pipes 221 are distributed uniformly across the cross section of the $NO_x$ catalyst 17. The upstream exhaust pipe 16' is connected to the narrow pipes 221 at the left side of the $NO_x$ catalyst in FIG. 22. The narrow pipes 221 are in communication with the upstream end 20 of the $NO_x$ catalyst 17 at the right side of the $NO_x$ catalyst 17 in FIG. 22. Further, the downstream end 24 of the $NO_x$ catalyst 24 is connected to the downstream exhaust pipe 16" at the left side of the $NO_x$ catalyst 17 in FIG. 22. Therefore, the exhaust gas flows from the upstream exhaust pipe 16' via the narrow pipes 221 into the $NO_x$ catalyst 17, and is discharged from the downstream exhaust pipe 16". In this embodiment, the flow direction of the exhaust gas flowing through the narrow pipes 221 is opposite to the flow direction of the exhaust gas flowing through the $NO_x$ catalyst 17. Note that the components of the eleventh embodiment other than that described regarding FIGS. 22 and 23 are the same as that of the sixth embodiment.

According to this embodiment, similar to the sixth embodiment, the heat of the hot exhaust gas flowing through the upstream exhaust pipe 16' is transferred to the downstream end 24 of the $NO_x$ catalyst 17 when the exhaust gas flows from the upstream exhaust pipe 16' into the narrow pipes 221. Therefore, the temperature of the downstream end 24 is raised up higher than the downstream predetermined temperature $T_2$. Further, the temperature of the exhaust gas flowing into the $NO_x$ catalyst 17 is decreased since the heat of the exhaust gas is transferred upstream of the $NO_x$ catalyst 17 and is discharged before the exhaust gas flows into the upstream end 20 of the $NO_x$ catalyst 17. Therefore, the temperature of the upstream end 20 of the $NO_x$ catalyst 17 is maintained lower than the upstream predetermined temperature $T_1$. Further, the temperature of the $NO_x$ catalyst across the cross section is uniform since the narrow pipes 221 are uniformly distributed in the $NO_x$ catalyst 17. Therefore, the high purifying ratio of $NO_x$ may be steadily obtained.

Figure 24:
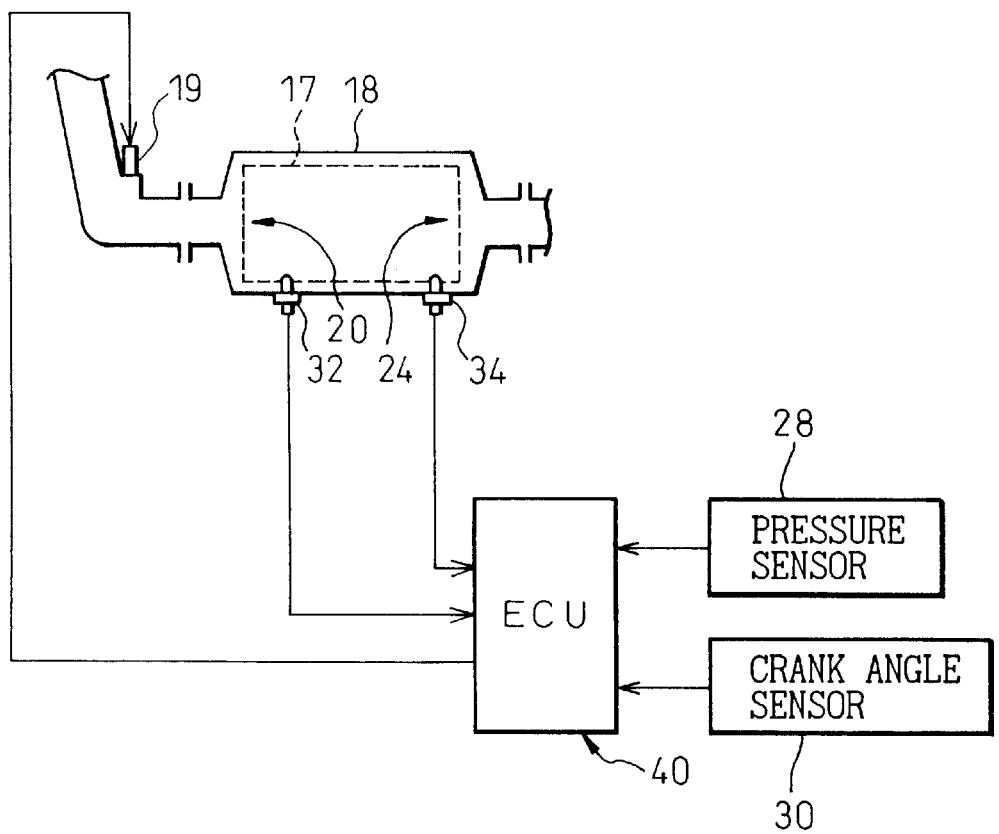
FIG. 24 is a view of the twelveth embodiment of the engine with the exhaust gas purification device according to the invention.
Figure 25:
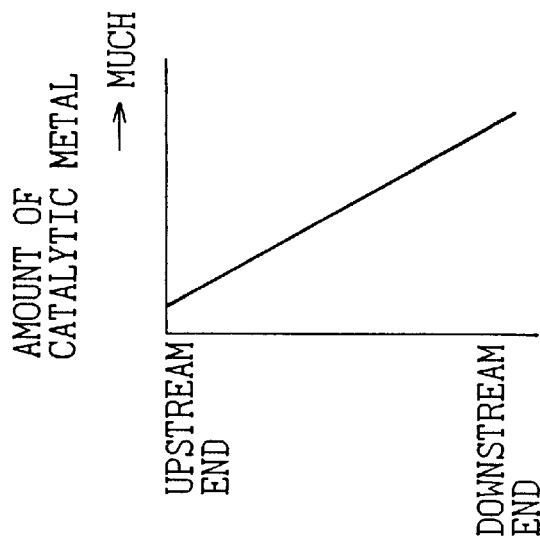
FIG. 25 is a graph indicating the amount of the catalytic metal in the direction of the upstream side to downstream side of the catalyst of the twelveth embodiment.
Figure 26:
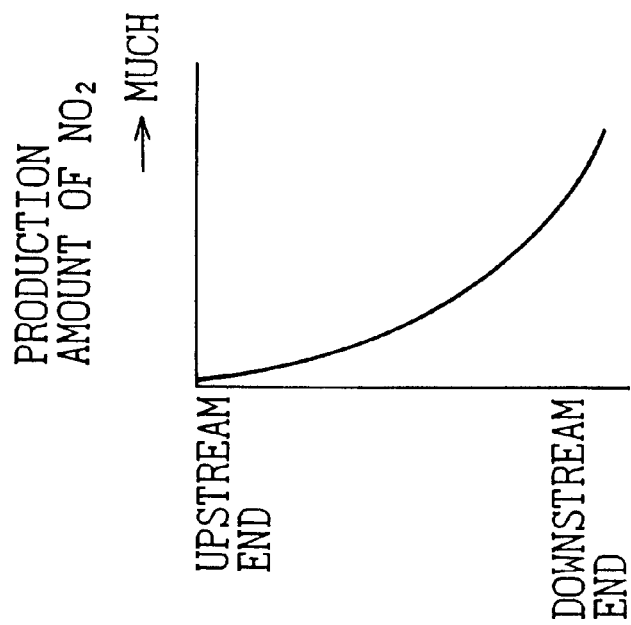
FIG. 26 is a graph indicating the amount of the production of $NO_2$ in the catalyst in the direction of the upstream side to downstream side of the catalyst of the twelveth embodiment.

FIG. 24 is a view of the twelveth embodiment of the engine with the exhaust gas purification device according to the invention. FIG. 25 is a graph indicating the amount of the catalytic metal in the direction of the upstream side to downstream side of the catalyst of the twelveth embodiment. FIG. 26 is a graph indicating the amount of the production of $NO_2$ in the catalyst in the direction of the upstream side to downstream side of the catalyst of the twelveth embodiment. In this embodiment, the HC supply valve 19 is controlled in the same way as the third embodiment. Therefore, the temperature of the upstream end 20 of the $NO_x$ catalyst 17 is maintained lower than the upstream predetermined temperature $T_1$. Further, in the exhaust gas purification device of this embodiment, an amount of the catalytic metal carried on the $NO_x$ catalyst 17 in the downstream side of the $NO_x$ catalyst 17 is larger than that in the upstream side of the $NO_x$ catalyst 17, and no heating device 26 is arranged on the downstream end 24 of the $NO_x$ catalyst 17. Thus, the density of the catalytic metal carried on the $NO_x$ catalyst 17 in the downstream side of the $NO_x$ catalyst 17 is larger than that in the upstream side of the $NO_x$ catalyst 17. The purification ratio for $NO_x$ is decided depending on the amount of the catalytic metal carried on the $NO_x$ catalyst 17. Typically, the larger the amount of the catalytic metal carried on the $NO_x$ catalyst 17, the larger the purification ratio for $NO_x$, and therefore as shown in FIG. 26, an amount of the $NO_2$ produced during the purifying reaction is increased. The purifying reaction of $NO_x$ produces heat. Therefore, the temperature in the downstream side of the $NO_x$ catalyst 17, which carries a large amount of the catalytic metal, is equal to or higher than that in the upstream side of the $NO_x$ catalyst 17. Thus, the temperature of the downstream end 24 of the $NO_x$ catalyst 17 is maintained higher than the downstream predetermined temperature $T_2$. Note that, in this embodiment, the catalyst itself constitutes the heating means and that the components of the twelveth embodiment other than that described regarding FIGS. 24, 25 and 26 are the same as that of the third embodiment.

Figure 27:
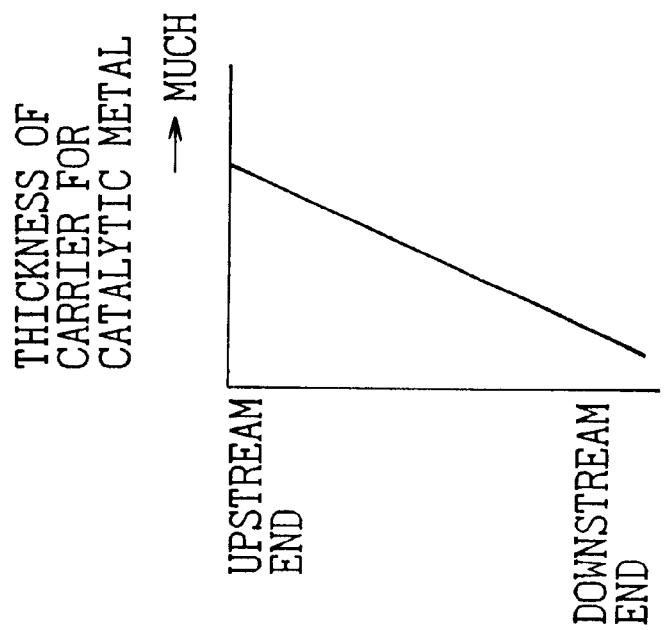
FIG. 27 is a graph indicating the thickness of the carrying layer of the catalytic metal in the direction of the upstream side to downstream side of the catalyst of the thirteenth embodiment.
Figure 28:
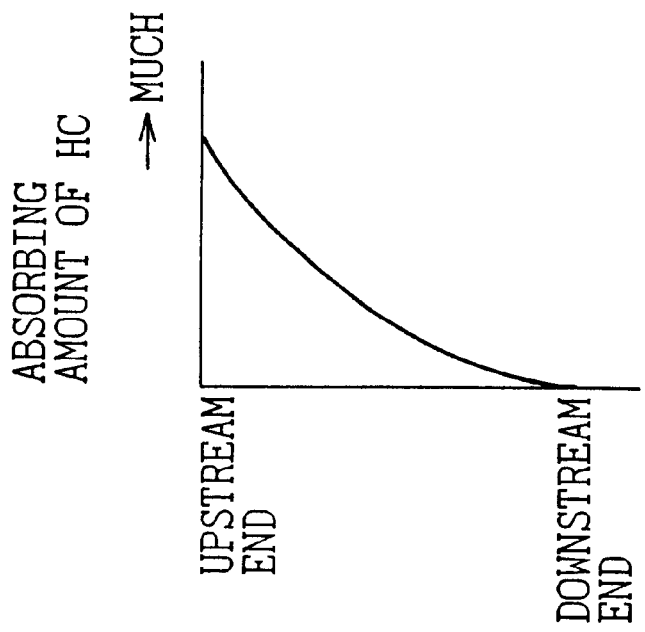
FIG. 28 is a graph indicating the absorbing amount of HC in the direction of the upstream side to downstream side of the catalyst of the thirteenth embodiment.
Figure 29:
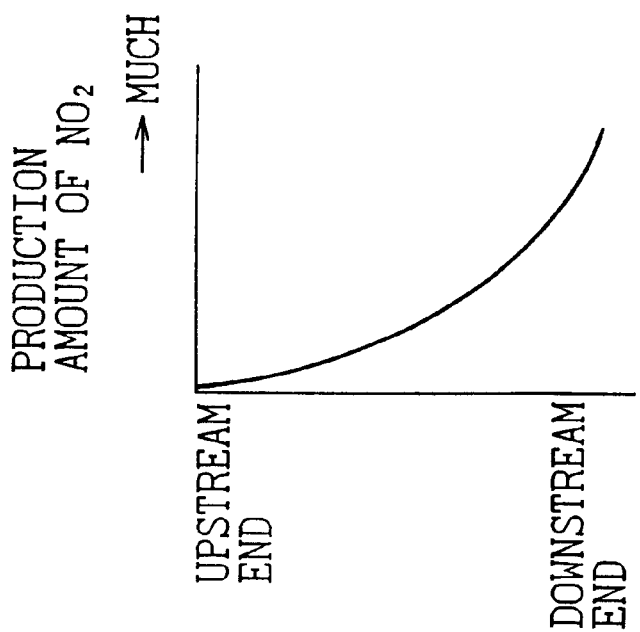
FIG. 29 is a graph indicating the amount of the production of $NO_2$ in the catalyst in the direction of the upstream side to downstream side of the catalyst.

FIG. 27 is a graph indicating the thickness of the carrier for the catalytic metal, i.e., the carrying layer of the catalytic metal in the direction of the upstream side to downstream side of the catalyst of the thirteenth embodiment. FIG. 28 is a graph indicating the absorbing amount of HC in the direction of the upstream side to downstream side of the catalyst of the thirteenth embodiment. FIG. 29 is a graph indicating the amount of the production of $NO_2$ in the catalyst in the direction of the upstream side to downstream side of the catalyst. In this embodiment, the thickness of the carrying layer of the catalytic metal in the upstream side of the $NO_x$ catalyst 17 is larger than that in the downstream side of the $NO_x$ catalyst 17 while, in the twelveth embodiment, the amount of the catalytic metal carried on the $NO_x$ catalyst 17 in the downstream side of the $NO_x$ catalyst 17 is larger than that in the upstream side of the $NO_x$ catalyst 17. Note that the components of the thirteenth embodiment other than that described regarding FIG. 27 are the same as that of the twelveth embodiment. Similar to the twelveth embodiment, the upstream end 20 of the $NO_x$ catalyst 17 is cooled by HC supplied from the HC supply valve 19 to the $NO_x$ catalyst 17. Therefore, the temperature of the upstream end 20 is maintained lower than the upstream predetermined temperature $T_1$. Further, once HC supplied from the HC supply valve is absorbed to the carrying layer of the catalytic metal, the HC progressively moves toward the downstream side of the $NO_x$ catalyst 17 and then is used to purify $NO_x$.

HC is heat-resolved to HC having a lower boiling point and a high reactivity for purifying. Typically, HC is heat-resolved as HC absorbed on the upstream side of the $NO_x$ catalyst 17 moves toward the downstream side of the $NO_x$ catalyst 17. When the reactivity of the HC becomes sufficiently high, the purifying reaction occurs. Therefore, it is advantageous for the purifying reaction of the $NO_x$ catalyst 17 that a large amount of HC is absorbed on the upstream side of the $NO_x$ catalyst 17. In this embodiment, a large amount of HC is absorbed on the upstream side of the $NO_x$ catalyst 17 since the thickness of the carrying layer of the catalytic metal in the upstream side of the $NO_x$ catalyst 17 is larger than that in the downstream side of the $NO_x$ catalyst 17. Therefore, a large amount of heat-resolved HC is used to purify $NO_x$ in the downstream side of the $NO_x$ catalyst 17. Further the temperature of the downstream end 24 of the $NO_x$ catalyst 17 is raised up higher than the downstream predetermined temperature $T_2$ since the large purifying reaction occurs in the downstream side of the $NO_x$ catalyst 17 and the large amount of heat is produced. Note that the catalyst itself is the heating device.

It should be understood that the invention is not limited to the above embodiments, and it is possible to constitute the exhaust gas purification device by combining the cooling means and the heating means of each of the embodiments.

If, in the fifth to thirteenth embodiments, the cooling means or the heating means is not sufficient to maintain the temperature of the upstream end of the $NO_x$ catalyst below the upstream predetermined temperature, or maintain the temperature of the downstream end of the $NO_x$ catalyst above the downstream predetermined temperature, the cooling means or the heating means of the first to fourth embodiments may be added to the fifth to thirteenth embodiments. In this case, the number of the operation of the added cooling means or the added heating means is reduced since there is a temperature gradient in the $NO_x$ catalyst by the fifth to thirteenth embodiments. Therefore, the life time of the added cooling means or the added heating means is extended.

While the invention has been described by reference to specific embodiments chosen for purposes of illustration, it should be apparent that numerous modifications can be made thereto by those skilled in the art without departing from the basic concept and scope of the invention.

We claim:

1. An exhaust gas purification device of an engine having an exhaust passage, said device comprising:

a catalyst arranged in the exhaust passage and having an upstream end and a downstream end, a purification ratio of exhaust gas by said catalyst becoming more than a predetermined ratio when a temperature of said catalyst is within a predetermined temperature range, cooling means for cooling said upstream end of said catalyst, heating means for heating said downstream end of said catalyst, and control means for controlling said cooling means and said heating means to maintain the temperature of a portion of said catalyst, which portion is positioned between said upstream end and said downstream end, at said predetermined temperature range.

2. An exhaust gas purification device of an engine according to claim 1, wherein said cooling means comprises a liquid supply device for supplying liquid to said upstream end of said catalyst.

3. An exhaust gas purification device of an engine according to claim 2, wherein said liquid supply device comprises a coolant passageway extending through said upstream end of said catalyst.

4. An exhaust gas purification device of an engine according to claim 2, wherein said liquid supply means comprises means for supplying a reducing agent to said upstream end of said catalyst.

5. An exhaust gas purification device of an engine according to claim 1, wherein said heating means comprises an electric heater arranged in said downstream end of said catalyst.

6. An exhaust gas purification device of an engine according to claim 1, wherein said heating means is constituted by said downstream end of said catalyst.

7. An exhaust gas purification device of an engine according to claim 6, wherein a cross sectional area of said downstream end of said catalyst is increased, as compared with said upstream end of said catalyst.

8. An exhaust gas purification device of an engine according to claim 6, wherein said catalyst includes catalytic metal therein for purifying the exhaust gas, and a density of said catalytic metal in said downstream end of said catalyst is increased, as compared with said upstream end of said catalyst.

9. An exhaust gas purification device of an engine according to claim 6, wherein said catalyst comprises a carrier and a layer formed on said carrier and including catalytic metal for purifying the exhaust gas, and a thickness of said layer in said upstream end of said catalyst is increased, as compared with said downstream end of said catalyst.

* * * * *